US012453943B2

(12) United States Patent
Johnson

(10) Patent No.: US 12,453,943 B2
(45) Date of Patent: Oct. 28, 2025

(54) COMPRESSED AIR FOAM MIXING SYSTEM

(71) Applicant: Zeco LLC, Chattanooga, TN (US)

(72) Inventor: Kyle B. Johnson, Booneville, IA (US)

(73) Assignee: Zeco LLC, Chattanooga, TN (US)

( * ) Notice: Subject to any disclaimer, the term of this patent is extended or adjusted under 35 U.S.C. 154(b) by 479 days.

(21) Appl. No.: 17/412,545

(22) Filed: Aug. 26, 2021

(65) Prior Publication Data

US 2021/0379541 A1 Dec. 9, 2021

Related U.S. Application Data

(63) Continuation-in-part of application No. 16/210,152, filed on Dec. 5, 2018, now abandoned.

(51) Int. Cl.

*B01F 23/23* (2022.01)
*B01F 23/232* (2022.01)
*B01F 23/235* (2022.01)
*B01F 25/31* (2022.01)
*B01F 35/71* (2022.01)
*B05B 7/00* (2006.01)

(52) U.S. Cl.

CPC ........ *B01F 23/235* (2022.01); *B01F 23/2323* (2022.01); *B01F 25/3111* (2022.01); *B01F 35/71745* (2022.01); *B05B 7/0025* (2013.01)

(58) Field of Classification Search

CPC .......................... B01F 23/235; B01F 23/2323; B01F 25/3111; B01F 35/71745; B01F 25/31423; B05B 7/0025; B05B 7/0483; B05B 7/2427

See application file for complete search history.

(56) References Cited

U.S. PATENT DOCUMENTS 3,258,160 A * 6/1966 Allen ....................... F17C 13/04 137/625.33
3,456,675 A * 7/1969 Weiner .................... F16K 51/00 62/48.1
3,918,647 A * 11/1975 Lamz ..................... A62C 5/002 239/432
4,186,772 A * 2/1980 Handleman ............. F04F 5/466 137/893
4,330,086 A * 5/1982 Nysted .................. B05B 7/0068 261/78.2
5,113,945 A * 5/1992 Cable ...................... B05B 7/267 261/DIG. 26
5,382,389 A * 1/1995 Goodine ........... B01F 25/31112 261/78.2

(Continued)

FOREIGN PATENT DOCUMENTS

CA 2781714 A1 * 5/2011 ............. B29B 7/761
CA 2797136 A1 * 10/2011 ............. B65D 83/00

(Continued)

OTHER PUBLICATIONS

Epo translation of DE10107826 (Year: 2002).*

*Primary Examiner* — Stephen Hobson
(74) *Attorney, Agent, or Firm* — DeWitt LLP

(57) ABSTRACT

A compressed air foam mixing system that has a mixing device connected to a discharge port of a tank. The mixing device receives fluid from the tank and pressurized air from the tank or alternatively directly from a source of pressurized air. The fluid and pressurized air are combined within the mixing device to form a foam.

25 Claims, 5 Drawing Sheets

(56) References Cited

U.S. PATENT DOCUMENTS

| | | | | |
|---|---|---|---|---|
| 6,742,599 | B1 * | 6/2004 | Nam | A62C 37/16 169/29 |
| 8,360,339 | B2 * | 1/2013 | Henry | A62C 13/66 239/432 |
| 8,882,001 | B2 * | 11/2014 | Henry | A62C 13/66 261/DIG. 26 |
| 8,893,815 | B2 * | 11/2014 | Mauney | A62C 31/05 169/30 |
| 9,364,697 | B2 * | 6/2016 | Petit | A62C 31/12 |
| 9,687,685 | B1 * | 6/2017 | Chmielewski | A62C 31/12 |
| 9,750,965 | B2 * | 9/2017 | Marlin | B05B 7/0006 |
| 10,099,078 | B1 * | 10/2018 | Blanchat | A62C 5/022 |
| 10,105,501 | B2 * | 10/2018 | Giroux | A61M 15/009 |
| 2010/0116512 | A1 * | 5/2010 | Henry | A62C 13/66 169/14 |
| 2010/0175897 | A1 * | 7/2010 | Crump | A62C 35/026 169/14 |
| 2015/0048176 | A1 * | 2/2015 | Jones | B05B 7/0433 239/8 |
| 2016/0263411 | A1 * | 9/2016 | Chung | A62C 13/003 |
| 2017/0266475 | A1 * | 9/2017 | Mahrt | A62C 5/022 |
| 2018/0071560 | A1 * | 3/2018 | Wang | A62C 13/70 |
| 2018/0104708 | A1 * | 4/2018 | Chang | B05B 7/2427 |
| 2023/0081097 | A1 * | 3/2023 | Johnson | F04B 49/12 417/426 |

FOREIGN PATENT DOCUMENTS

| | | | | | |
|---|---|---|---|---|---|
| DE | 10016926 | A1 * | 10/2001 | | B01F 25/312 |
| DE | 10107826 | A1 * | 9/2002 | | B01F 25/31242 |
| EP | 0088029 | A1 * | 9/1983 | | B05B 7/262 |
| FR | 2543840 | A1 * | 10/1984 | | B05B 7/0408 |
| WO | WO-0136105 | A1 * | 5/2001 | | B05B 7/0416 |
| WO | WO-0176764 | A1 * | 10/2001 | | A62C 31/02 |
| WO | WO-2008123837 | A1 * | 10/2008 | | A62C 13/003 |
| WO | WO-2013138160 | A1 * | 9/2013 | | B05B 7/0025 |
| WO | WO-2014201322 | A1 * | 12/2014 | | B05B 11/1015 |

* cited by examiner

COMPRESSED AIR FOAM MIXING SYSTEM

CROSS REFERENCE TO RELATED APPLICATION

This application is a Continuation-in-part of U.S. Ser. No. 16/210,152 filed Dec. 5, 2018, the contents of this application is hereby incorporated by reference in its entirety.

BACKGROUND OF THE INVENTION

The present invention is directed to a compressed air foam mixing system and more particularly a system for producing antibacterial or biodecontaminant foam to kill molds, yeast and the like.

Compressed air foam systems are known in the art. Generally, these devices are used to produce foam to combat fires. A typical system includes a foam injector system, a water pump system, and an air system including an air compressor for supplying air under pressure. While useful, these systems are complex in their design, have many parts, and are expensive to produce. Accordingly, a need exists in the art for a system that addresses these deficiencies.

An objective of the present invention is to provide a compressed air foam system that has a simple design and is inexpensive to manufacture.

These and other objectives will be apparent to those having ordinary skill in the art based upon the following written description, drawings, and claims.

SUMMARY OF THE INVENTION

A compressed air foam mixing system includes a mixing device connected to a discharge port of a tank that contains a fluid. The mixing device has a hollow, elongated body with a first end, a second end, and a side wall. The first end has an end wall that surrounds a central opening. The central opening aligns with a central bore that extends from the first end of the elongated body to a mixing chamber and the mixing chamber extends from the central bore to the second end of the elongated body.

The central bore is formed by an inner wall that extends from the first end of an elongated body to a shoulder that is preferably angled. The end wall has a plurality of apertures that surround the central opening. The apertures are aligned and in communication with a plurality of bores that extend through the inner wall and preferably are angled toward, and in communication with, the central bore.

A pick-up tube is connected to the central bore of the mixing device and extends from the mixing device to the bottom of the tank. The pick-up tube supplies fluid, under pressure, to the mixing chamber of the mixing device. Pressurized air is supplied to the mixing chamber either from the tank through the bores that surround the central bore or directly from a source of pressurized air through an air port in the side wall of the mixing device.

DETAILED DESCRIPTION

Figure 4:
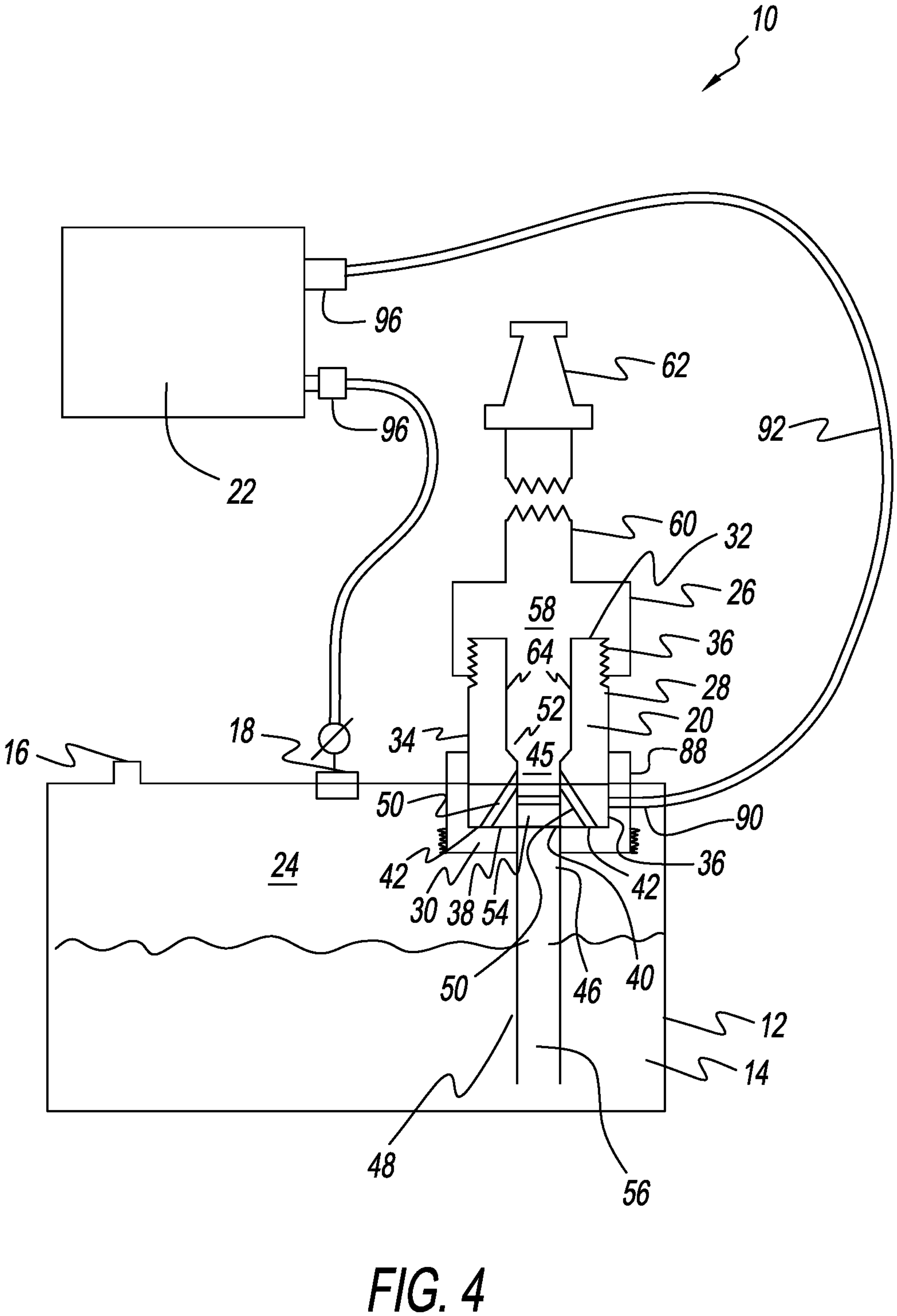
FIG. 4 is a side sectional view of a compressed air foam mixing system.

Referring to the Figures, which is best shown in FIG. 4, a compressed air foam mixing system 10 includes a tank 12 filled with fluid 14. Preferably, the fluid 14 is an antibacterial or biodecontaminant for killing molds, yeast, and the like. The tank 12 has an air port 16, an air pump valve 18, and a threaded discharge port 20. The air pump valve 18 is connected to a source of pressurized air 22 and provides pressurized air 24 to the tank.

Figure 1:
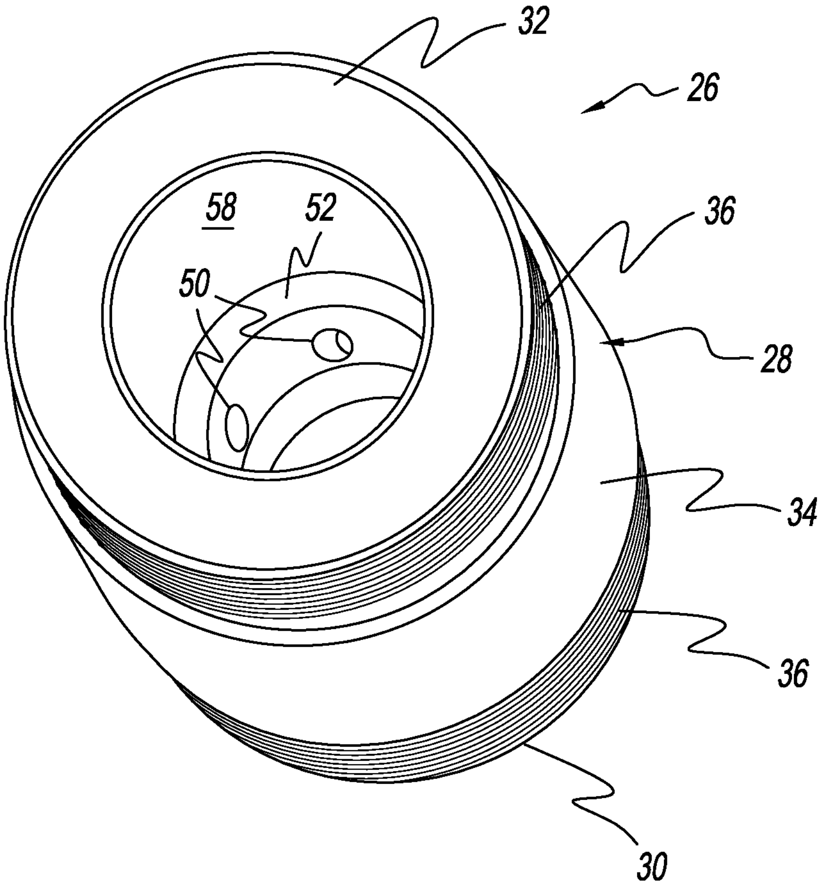
FIG. 1 is a top perspective view of a mixing device.
Figure 2:
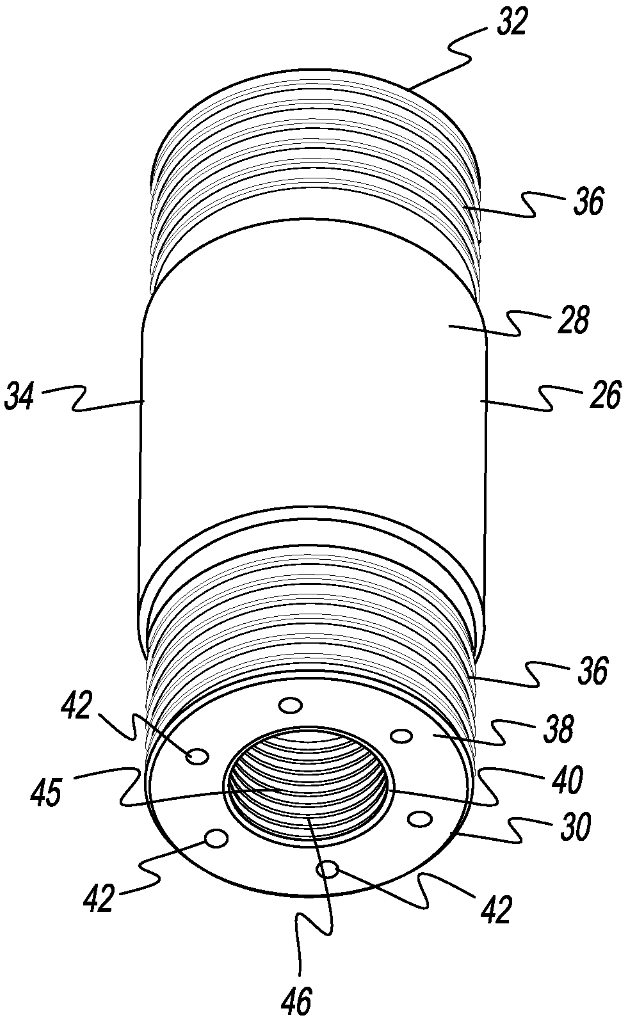
FIG. 2 is a bottom perspective view of a mixing device.
Figure 3:
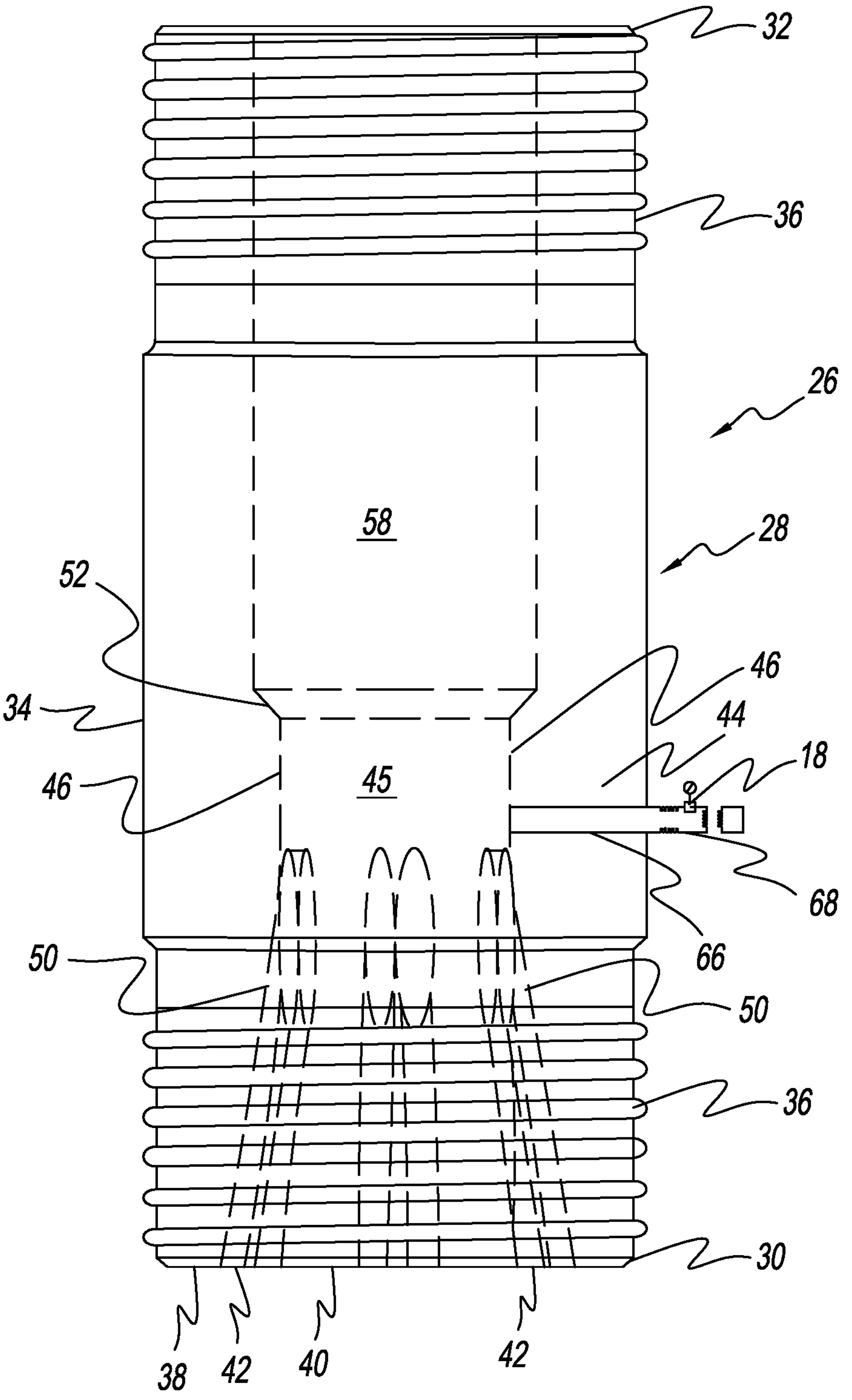
FIG. 3 is a side sectional view of a mixing device.

A mixing device 26 is threadably connected to the discharge port 20. While the mixing device 26 is of any size, shape, and structure, in one example, as shown in FIGS. 1-3, the mixing device 26 has an 20 elongated, hollow, cylindrical body 28 having a first end 30, a second end 32, and a side wall 34. Adjacent each end 30 and 32, an outer surface 36 of the side wall 34 is threaded.

The first or lower end 30 of the mixing device 26 has an end wall 38 that surrounds a central opening 40, as shown in FIGS. 2 and 3. The end wall 38 has a plurality of apertures 42 that surround the central opening 40. Extending from the end wall 38, into the hollow body 28, is a partial inner wall 44 that is adjacent the central opening 40 to form a central bore 45. An inner surface 46 of the central bore 45 is threaded to threadably receive a pick-up tube 48. A plurality of bores 50 extend from, and are in alignment with, the apertures 42. Bores 50 extend from the apertures 42 to an inner shoulder 52 that is formed by the termination of the inner wall 44. Preferably, the shoulder 52 is angled outwardly from the central bore 45 and upwardly toward the second end 32. Alternatively, the bores 50 are angled upwardly, and inwardly, and are in communication with the central bore 45.

Figure 5:
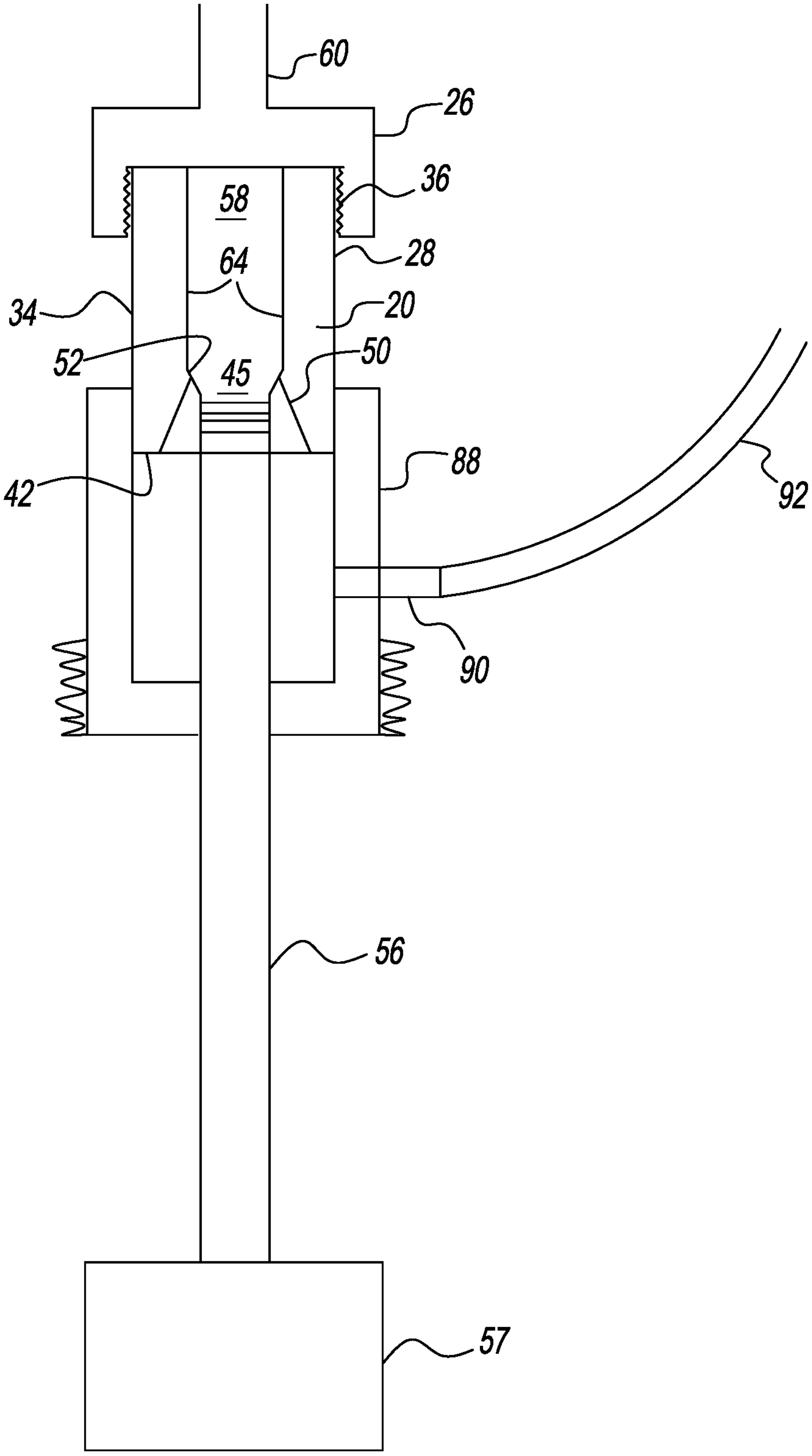
FIG. 5 is a side sectional view of a compressed air foam mixing system.

Referring now to FIGS. 4 and 5, the pick-up tube 48 has a threaded head 54 and an elongated conduit or hose 56, such that the threaded head 54 is connected to, and in communication with, elongated conduit or hose 56. The threaded head 54 is connected to the inner surface 46 of the central bore 45. The hose 56 extends from the head 54 to the bottom of the tank 12.

The central bore 45 and the plurality of bores 50 are in communication with a mixing chamber 58, as best shown in FIG. 3. The mixing chamber 58 extends from the shoulder 52 of the inner wall 44 to the second end 32 of the elongated body 28. A hose 60 having a nozzle 62 is threadably attached to the threaded outer surface 36 of the second end 32.

In operation, as shown in relation to FIG. 4, pressurized air 24 is supplied to the tank 12 from the source of pressurized air 22 through the air pump valve 18. When the nozzle 62 is activated and opened the pressurized air 24 flows through the plurality of bores 50 and into the mixing chamber 58. The pressurized air 24 also acts upon the fluid 14 causing the fluid 14 to flow through the pick-up tube 48, into the central bore 45, and finally into the mixing chamber 58. The diameter of bores 50 preferably ⅛ inches, the diameter of the central bore 45 preferably ¾ inches, and the diameter of the mixing chamber 58 preferably ⅞ inches, causes the pressurized air 24 to mix with the fluid 14 to create a foam 64. The foam 64 flows from the mixing chamber 58, through the hose 60, and out the nozzle 62.

In an alternative embodiment, as shown in FIG. 3, the elongated body 28 has an air port 66 in the side wall 34 to which the source of pressurized air 22 is connected via a conduit 68. The air pump valve 18 is connected to the conduit 68. This embodiment works the same as the previous embodiment except pressurized air 24 is supplied through air port 66 instead of directly to the tank 12.

In an another alternative embodiment, as shown in relation to FIG. 5, connected to the end of the hose 56 is a check valve 57. The hose 56 extends from the check valve 57 through the mixing device 100 to the output 60. The mixing device 26 is connected to and in communication with the output 60. The mixing device includes a top 27 threadably connected to a cylindrical body 28 as previously described. The cylindrical body 28 is threadably connected to an air manifold 88 that is sealed about hose 56. The air manifold 88 has an air port 90. The air port 90 is connected to a source of pressurized air 22 by line 92. The pressurized air 22 is controlled by a control system 94. The pressurized air 22 has check valves 96 that lead to air port 90 and pump valve 18.

As a result of the foregoing embodiments show in FIGS. 4-5, a pressure differential is created between the air provided to the mixing device 26 and the air tank 12. This allows the pressures to be adjusted to fine tune the consistency of the foam between wet and dry. The tank pressure 12 affects how far the foam sprays while the air supplied to the air manifold 88 affects the foam consistency.

From the above discussion and accompanying figures and claims it will be appreciated that a compressed air foam mixing system 10 offers many advantages over the prior art. It will be appreciated further by those skilled in the art that various other modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A compressed air foam mixing system, comprising:

a source of pressurized air;

a tank filled with fluid, the tank in fluid communication with the source of pressurized air such that the fluid comprises a pressurized air portion and a pressurized liquid portion, the tank having a discharge port;

a mixing device connected to the discharge port, the mixing device having a hollow elongated body with a first end having a first end wall surrounding a first central opening, a second end having a second end wall surrounding a second central opening, a side wall extending between the first and second end walls, a partial inner wall extending from the first end wall towards the second end wall that terminates at an intermediate location between the first and second end walls defining an inner shoulder, a central bore extending from the first central opening of the first end wall to proximate the inner shoulder, a mixing chamber extending from the second central opening of the second end wall to proximate the inner shoulder, wherein a first diameter of the central bore is narrower than a second diameter of the mixing chamber, a plurality of bores extending from a plurality of outer apertures surrounding the first central opening at the first end wall through at least a portion of the side wall to a plurality of inner apertures located at the partial inner wall of the central bore, such that each of the plurality of outer apertures are in fluid communication with the central bore via a corresponding inner aperture and respective bore;

an air manifold connected between the mixing device and the discharge port, the air manifold in fluid communication with the source of pressurized air;

a pick-up tube having a threaded head operably connected to a threaded portion of the partial inner wall of the central bore, the pick-up tube having an elongated hose operably connected to a check valve; wherein the air manifold is sealed about the elongated tube; and an output assembly connected with the mixing chamber;

wherein the mixing chamber is configured to receive a first input flow of pressurized air from the source of pressurized air that is provided to the air manifold and then entering into the plurality of bores and a second input flow of the pressurized liquid portion from the tank that is provided to the pick-up tube and then entering into the central bore, such that the mixing chamber is configured to mix the first input flow of pressurized air and the second flow of the pressurized liquid portion to form a foam;

wherein the output assembly is configured to discharge a flow of foam from the mixing chamber; and wherein the first end wall is in a perpendicular configuration to each of the first input flow of pressurized air entering into the plurality of bores and the second input flow of the pressurized liquid portion entering into the central bore.

2. The system of claim 1, wherein a first air pump valve is connected between the source of pressurized air and the tank, and wherein the first air pump valve is adapted to provide the pressurized air portion within the tank.

3. The system of claim 2, wherein a second air pump valve is connected between the source of pressurized air and an air port in a side wall of the air manifold, and wherein the second air pump valve is adapted to provide pressurized air through the plurality of bores and into the mixing chamber of the mixing device.

4. The system of claim 3, wherein the air port is connected to the source of pressurized air by a line.

5. The system of claim 1, wherein each of the plurality of bores has a smaller diameter than the central bore.

6. The system of claim 5, wherein the inner shoulder is configured to be angled outwardly from the central bore and upwardly toward the second end of the hollow elongated body.

7. The system of claim 1, wherein the mixing device is threadedly connected to the air manifold.

8. The system of claim 1, further comprising a control system, wherein the source of pressurized air is configured to be controlled by the control system to create a pressure differential between the first input flow of pressurize air and the second input flow of pressurized liquid, such that the source of pressurized air provided to the air manifold affects the flow of pressurized air into the mixing chamber and foam consistency between wet and dry.

9. The system of claim 8, wherein the source of pressurized air provided to the tank affects the flow of pressurized liquid into the mixing chamber and how far the foam can be sprayed.

10. The system of claim 9, wherein the source of pressurized air has a first check valve that leads to an air port of the air manifold and a second check valve that leads to an air pump valve of the tank.

11. The system of claim 10, wherein the control system is configured to control the pressure differential to adjust foam consistency, foam velocity discharged from the output assembly, or a combination thereof.

12. The system of claim 1, wherein the output assembly having a hose and a nozzle, a first end of the hose connected to the second end of the mixing device and a second end of the hose connected to the nozzle.

13. The system of claim 12, wherein the nozzle of the output assembly is configured to activate each of the first input flow of pressurized air and the second input flow of pressurized liquid portion into the mixing chamber to form the foam.

14. The system of claim 1, wherein the pressurized liquid portion of the fluid comprises an antibacterial or biodecontaminant.

15. The system of claim 1, wherein the second end wall is in a perpendicular configuration to the flow of foam being discharged from the mixing chamber.

16. The system of claim 15, wherein the first end wall is in an opposing parallel configuration with the second end wall.

17. A compressed air foam mixing system, comprising:

a source of pressurized air;

a tank containing a fluid comprising an air portion and a liquid portion and having an air input and a discharge port, the tank configured to be in fluid communication with the source of pressurized air via the air input to pressurize the fluid within the tank to provide a pressurized air portion and a pressurized liquid portion;

a mixing device connected to the discharge port of the tank, the mixing device comprising a hollow elongated body having a first end and an opposing second end, the first end having a first end wall surrounding a first central opening, the second end having a second end wall surrounding a second central opening, an outer side wall extending between the first and second end walls, a partial inner wall extending from the first end wall towards the second end wall and terminating at an intermediate location between the first and second end walls defining an inner shoulder, a central bore extending from the first central opening of the first end wall to proximate the inner shoulder, a mixing chamber extending from the second central opening of the second end wall to proximate the inner shoulder, and a plurality of bores extending through a least a portion of the outer side wall from a plurality of outer apertures surrounding the first central opening to a plurality of inner apertures located proximate the partial inner wall of the central bore, such that each of the plurality of outer apertures are in fluid communication with the central bore via a corresponding inner aperture and respective bore, wherein the central bore having a first diameter that is narrower than a second diameter of the mixing chamber; and a pick-up tube operably connected to the central bore proximate the first end of the mixing device;

wherein the mixing chamber is configured to receive and mix a first input flow of pressurized air entering from the plurality of bores and a second input flow of the pressurized liquid portion entering from the central bore via the pick-up tube to form a foam; and wherein the first end wall is in a perpendicular configuration to each of the first input flow of pressurized air entering into the plurality of bores and the second input flow of the pressurized liquid portion entering into the central bore.

18. The system of claim 17, wherein an air pump valve is connected to the tank and adapted to provide pressurized air to the tank to pressurize the fluid within the tank.

19. The system of claim 17, wherein the source of pressurized air is in fluid communication with the plurality of bores and is provided to the mixing device through at least a portion of the outer side wall of the mixing device.

20. The system of claim 17, wherein the plurality of bores extend through the partial inner wall of the mixing device to an intermediate position located between the inner shoulder and the first end.

21. The system of claim 20, wherein the inner shoulder is angled outwardly from the central bore and upwardly toward the second end of the hollow elongated body.

22. The system of claim 17, wherein the pick-up tube has a threaded head and a conduit, the threaded head configured to be threadably received within at least a threaded portion of the partial inner wall of the central bore and the conduit configured to extend from the threaded head to a bottom portion of the tank.

23. The system of claim 17, further comprising an output assembly having a hose and a nozzle, the hose connected to the second end of the mixing device at one end and the nozzle at an opposite end of the hose.

24. A compressed air foam mixing system, comprising:

a tank having an air port and a discharge port in fluid communication with a source of pressurized air; and a mixing device connected to the discharge port of the tank, the mixing device having a hollow body extending from a first end having a first end wall to a second end having a second end wall, the first end wall surrounding a first central opening and the second end wall surrounding a second central opening; a central bore having an inner wall that extends from the first end to an inner shoulder, whereby the shoulder angling outwardly from the central bore and upwardly towards the second end; the central bore extending through the mixing device from the first end to the inner shoulder defining a mixing chamber extending from the inner shoulder to the second end, such that the inner shoulder defines an internal transition within the mixing device from the central bore to the mixing chamber with a first diameter of the central bore being narrower than a second diameter of the mixing chamber; the first end of the mixing device received in the discharge port of the tank; a pickup tube having a head portion connected to the first end of the mixing device; the pickup tube having a conduit portion extending from the head portion into a bottom portion of the tank; and a plurality of bores in fluid communication with the source of pressurized air, the plurality of bores extending at an angle inwardly and upwardly from the first end wall surrounding the first central opening to a location within the central bore located between the inner shoulder and the first end wall;

wherein the mixing chamber is configured to receive a first input flow of pressurized air from the plurality of bores and a second input flow of a pressurized liquid from the central bore via the pickup tube;

wherein the mixing chamber is configured to mix the first input flow of pressurized air and the second input flow of pressurized liquid to form a foam; and wherein the first end wall is in a perpendicular configuration to each of the first input flow of pressurized air entering into the plurality of bores and the second input flow of pressurized liquid entering into the central bore.

25. The system of claim 24, wherein an air pump valve is configured to be in fluid communication with the source of pressurized air to receive a flow of pressurized air into the tank to provide the first input flow of pressurized air and the second input flow of pressurized liquid, such that the first input flow of pressurized air in the tank is received through the plurality of bores and caused to flow to the mixing chamber of the mixing device, and the second input flow of pressurized liquid within the tank is caused to flow through the pickup tube into the central bore and then into the mixing chamber of the mixing device.

* * * * *